(12) United States Patent
Pena

(10) Patent No.: US 11,129,340 B1
(45) Date of Patent: Sep. 28, 2021

(54) PLANT TRAINING DEVICE

(71) Applicant: Gabriel Pena, Flushing, MI (US)

(72) Inventor: Gabriel Pena, Flushing, MI (US)

( * ) Notice: Subject to any disclaimer, the term of this patent is extended or adjusted under 35 U.S.C. 154(b) by 0 days.

(21) Appl. No.: 17/146,681

(22) Filed: Jan. 12, 2021

(51) Int. Cl.
A01G 9/12 (2006.01)

(52) U.S. Cl.
CPC ...................... A01G 9/12 (2013.01)

(58) Field of Classification Search
CPC ................ A01G 9/12; A01G 9/128
USPC ................................................ 47/4
See application file for complete search history.

(56) References Cited

U.S. PATENT DOCUMENTS

| 78,787 | A | * | 6/1868 | Conner | A01G 9/12 47/44 |
| 879,047 | A | * | 2/1908 | Heubner | A01G 9/12 47/47 |
| 917,655 | A | * | 4/1909 | Pittman et al. | A01G 9/12 47/47 |
| 926,274 | A | * | 6/1909 | Meneray | A01G 9/12 47/47 |
| 1,073,114 | A | * | 9/1913 | Gudgeon | A01G 9/12 47/47 |
| 2,011,990 | A | * | 8/1935 | Aldridge | A01G 9/12 47/47 |
| 2,030,249 | A | * | 2/1936 | Goldberg | A01G 9/12 47/44 |
| 2,079,332 | A | * | 5/1937 | Overly | A01G 9/12 47/47 |
| 2,113,688 | A | * | 4/1938 | Grant | A01G 9/12 47/41.01 |
| 2,152,018 | A | * | 3/1939 | Barnhart | A01G 9/12 47/44 |
| 2,173,217 | A | * | 9/1939 | Thomsen | A01G 9/12 47/47 |
| 2,242,168 | A | * | 5/1941 | Bergman | A01G 9/12 47/47 |

(Continued)

FOREIGN PATENT DOCUMENTS

| CA | 2197151 A1 | * | 8/1998 | ............ A01G 9/12 |
| CA | 2276877 A1 | * | 1/2001 | ............ A01G 9/12 |

(Continued)

OTHER PUBLICATIONS

EngineeredEssentials. (2020, 7 8). Growth Manipulation Kit for Low Stress Plant Training. Retrieved from Etsy: https://www.etsy.com/listing/788641831/growth-manipulation-kit-for-low-stress.*

(Continued)

Primary Examiner — Monica L Barlow
Assistant Examiner — Aaron M Rodziwicz
(74) Attorney, Agent, or Firm — Christopher G. Darrow; Darrow Mustafa PC

(57) ABSTRACT

A plant training device includes a base portion having a semi-cylindrical radially interior face and a semi-cylindrical radially exterior face opposite the interior face. A first arm extends radially outwardly from the exterior face, and a second arm extends radially outwardly from the exterior face so as to be angularly spaced apart from the first arm. A first wall extends from the first arm so as to be radially spaced apart from the exterior face and directly opposite the exterior face. A second wall extends from the second arm so as to be radially spaced apart from the exterior face and directly opposite the exterior face.

15 Claims, 4 Drawing Sheets

(56) References Cited

U.S. PATENT DOCUMENTS

| | | | | |
|---|---|---|---|---|
| 2,266,470 | A * | 12/1941 | Moran | A01G 9/12 47/44 |
| 2,267,004 | A * | 12/1941 | Weihe | A01G 9/12 47/47 |
| 2,285,522 | A * | 6/1942 | Lawrenz | A01G 9/12 47/47 |
| 3,026,650 | A * | 3/1962 | Miller | A01G 9/12 47/46 |
| 3,778,929 | A * | 12/1973 | Pearson | A01G 9/12 47/58.1 R |
| 4,213,272 | A * | 7/1980 | Nievelt | A01G 9/12 47/45 |
| 4,249,342 | A * | 2/1981 | Williams | A01G 9/12 47/43 |
| 5,542,210 | A * | 8/1996 | Hupfl | A01G 9/12 47/44 |
| 5,921,020 | A * | 7/1999 | Avidan | A01G 23/04 47/4 |
| 6,065,899 | A * | 5/2000 | Adams | A01G 9/12 248/74.2 |
| 6,389,744 | B1 * | 5/2002 | Pugh | A01G 9/12 211/181.1 |
| 6,604,320 | B1 * | 8/2003 | Hsia | A01G 17/10 211/119.12 |
| 6,718,691 | B2 * | 4/2004 | Taylor | A01G 17/06 24/455 |
| 7,219,467 | B1 * | 5/2007 | Branman | A01G 9/12 47/45 |
| 7,328,532 | B2 * | 2/2008 | Golan | A01G 9/12 47/4 |
| 7,661,224 | B1 * | 2/2010 | Poyas | A01G 9/12 47/42 |
| 8,935,879 | B1 * | 1/2015 | Falk | A01G 9/124 47/45 |
| 8,943,747 | B2 * | 2/2015 | Buck | A01G 17/04 47/42 |
| 2006/0026895 | A1 * | 2/2006 | Pravettoni | A47G 7/07 47/39 |
| 2009/0250011 | A1 * | 10/2009 | Biggs | A01G 9/12 119/246 |
| 2011/0308151 | A1 * | 12/2011 | Wu | A01G 9/12 47/46 |
| 2012/0055083 | A1 * | 3/2012 | Marquez | A01G 9/12 47/45 |
| 2012/0073193 | A1 * | 3/2012 | Duplantis | A01G 9/12 47/45 |
| 2012/0159844 | A1 * | 6/2012 | Davis | A01G 9/12 47/45 |
| 2014/0041294 | A1 * | 2/2014 | Babcock | A01G 17/06 47/46 |
| 2014/0259911 | A1 * | 9/2014 | Davis | A01G 9/12 47/65.5 |
| 2015/0033623 | A1 * | 2/2015 | Mauro | A01G 9/12 47/47 |
| 2016/0302366 | A1 * | 10/2016 | Shadowshot | A01G 9/128 |
| 2016/0345511 | A1 * | 12/2016 | Akana | A01G 7/06 |
| 2017/0020083 | A1 * | 1/2017 | Piskala | A01G 9/128 |
| 2017/0261019 | A1 * | 9/2017 | Johnson | F16B 2/241 |

FOREIGN PATENT DOCUMENTS

| | | | | |
|---|---|---|---|---|
| CA | 2831425 | A1 * | 4/2014 | A01G 9/12 |
| CA | 3010800 | A1 * | 7/2017 | A01G 9/12 |
| DE | 202017102276 | U1 * | 6/2017 | A01G 9/12 |
| DE | 202018101969 | U1 * | 4/2018 | A01G 9/12 |
| EP | 0578321 | A1 * | 1/1994 | A01G 9/12 |
| EP | 2387876 | A2 * | 11/2011 | A01G 5/04 |
| EP | 2801250 | A2 * | 11/2014 | A01G 9/12 |
| FR | 2862486 | A1 * | 5/2005 | A01G 9/12 |
| FR | 2873262 | A1 * | 1/2006 | A01G 9/12 |
| FR | 2912031 | A1 * | 8/2008 | A01G 9/12 |
| NL | 9301497 | A * | 3/1995 | A01G 17/10 |
| NL | 1008853 | C2 * | 10/1999 | A01G 9/12 |
| WO | WO-2008002589 | A2 * | 1/2008 | A01G 9/12 |
| WO | WO-2008070855 | A2 * | 6/2008 | A01G 9/12 |
| WO | WO-2010150632 | A1 * | 12/2010 | A01G 9/12 |
| WO | WO-2013063704 | A1 * | 5/2013 | A01G 9/126 |
| WO | WO-2015089094 | A1 * | 6/2015 | A01G 9/128 |
| WO | WO-2018186908 | A2 * | 10/2018 | A01G 9/124 |

OTHER PUBLICATIONS

"90 Degree Plant Bender (35 Pack) for Low Stress Training (LST) and Plant Training", found at: https://www.etsy.com/listing/822721092/90-degree-plant-bender-35-pack-for-low?ga_order=most relevant&ga_search_type=all&ga_view_type=gallery&ga_search_query=PLANT+TRAINER&ref=sc_gallery-1-1&plkey=deb34df672b3041936cc01acb9ac6065d0052cb4%3A822721092&col=1 (accessed on Jan. 8, 2021).

"Plant Training Aids—Easy 2-in-1 Trainers—30 Pack—90-Degree & Straightener—4mm Branch", found at: https://www.etsy.com/listing/832488191/plant-training-aids-easy-2-in-1-trainers?ga_order=most_relevant&ga_search_type=all&ga_view_type=gallery&ga_search_query=PLANT+TRAINER&ref=sr_gallery-1-7&organic_search_click=1&col=1 (acessed on Jan. 8, 2021).

"Super Crop Training Aids—90 Degree Support", found at: https://www.etsy.com/listing/877922643/super-crop-training-aids-90-degree?ga_order=most_relevant&ga_search_type=all&ga_view_type=gallery&ga_search_query=PLANT+TRAINER&ref=sr_gallery-1-15&organic_search_click=1&col=1 (accessed Jan. 8, 2021).

"ZYP 20 Pcs Plant Bender, Branches Bender Bending Clips Twig Clamps Plant Trainer Clips for Low Stress Training (LST)", found at: https://www.amazon.com/ZYP-Branches-Bending-Trainer-Training/dp/B08MZMGHK3/ref=sr_1_10?dchild=1&keywords=plant+trainer&qid=1608393434&sr=8-10 (accessed on Jan. 8, 2021).

"HMG 90 Degree Plant Benders for Low Stress Training (LST), No Stake Trellis, and Plant Training" found at: https://www.amazon.com/Degree-Benders-Stress-Training-Trellis/dp/B08KYMCHLP/ref=sr_1_39?dchild=1&keywords=plant+trainer&qid=1608393555&sr=8-39 (accessed on Jan. 8, 2021).

* cited by examiner

PLANT TRAINING DEVICE

TECHNICAL FIELD

The present invention relates to devices for facilitating and enhancing the growth of plants and, more particularly, to a plant training device enabling the growth directions of plant a stem to be reoriented or adjusted to a desired direction.

BACKGROUND

The natural growth of a plant tends to be upward towards a light source, whether it is natural sunlight or an artificial light source. In many cases, the top leaves receive most of the available light. The lower plant leaves may then be in full shade from the leaves above, or these leaves may not be facing the light source. This may result in low levels of chloroform production as a result of reduced photosynthesis. Controlling the growth footprint of the plant allows available growing space to be utilized more efficiently, by directing various portions of the plant into spaces that receive greater amounts of light. In addition, redirecting certain plant stems and leaves away from what would otherwise be their natural growth directions may provide photosensitive locations and fruit/bud sites with more sunlight. Higher levels of photosynthesis also result in high levels of plant growth and increase growth in locations of the flower and colas.

SUMMARY

In one or more implementations, a plant training device is provided. The plant training device includes a base portion having a semi-cylindrical radially interior face and a semi-cylindrical radially exterior face opposite the interior face. A first arm extends radially outwardly from the exterior face, and a second arm extends radially outwardly from the exterior face so as to be angularly spaced apart from the first arm. A first wall extends from the first arm so as to be radially spaced apart from the exterior face and directly opposite the exterior face. A second wall extends from the second arm so as to be radially spaced apart from the exterior face and directly opposite the exterior face.

DETAILED DESCRIPTION

Embodiments of a plant training device described herein include a base portion having a semi-cylindrical radially interior face and a semi-cylindrical radially exterior face opposite the interior face. A first arm extends radially outwardly from the exterior face, and a first wall extends from the first arm so as to be radially spaced apart from the exterior face and directly opposite the exterior face, thereby forming a first channel between the exterior face, the first arm, and the first wall. A second arm extends radially outwardly from the exterior face so as to be angularly spaced apart from the first arm, and a second wall extends from the second arm so as to be radially spaced apart from the exterior face and directly opposite the exterior face, thereby forming a second channel between the exterior face, the second arm, and the second wall. A portion of the base portion extending between the first and second channels is structured to form a bend vertex for a plant stem extending between the first and second channels.

Figure 1:
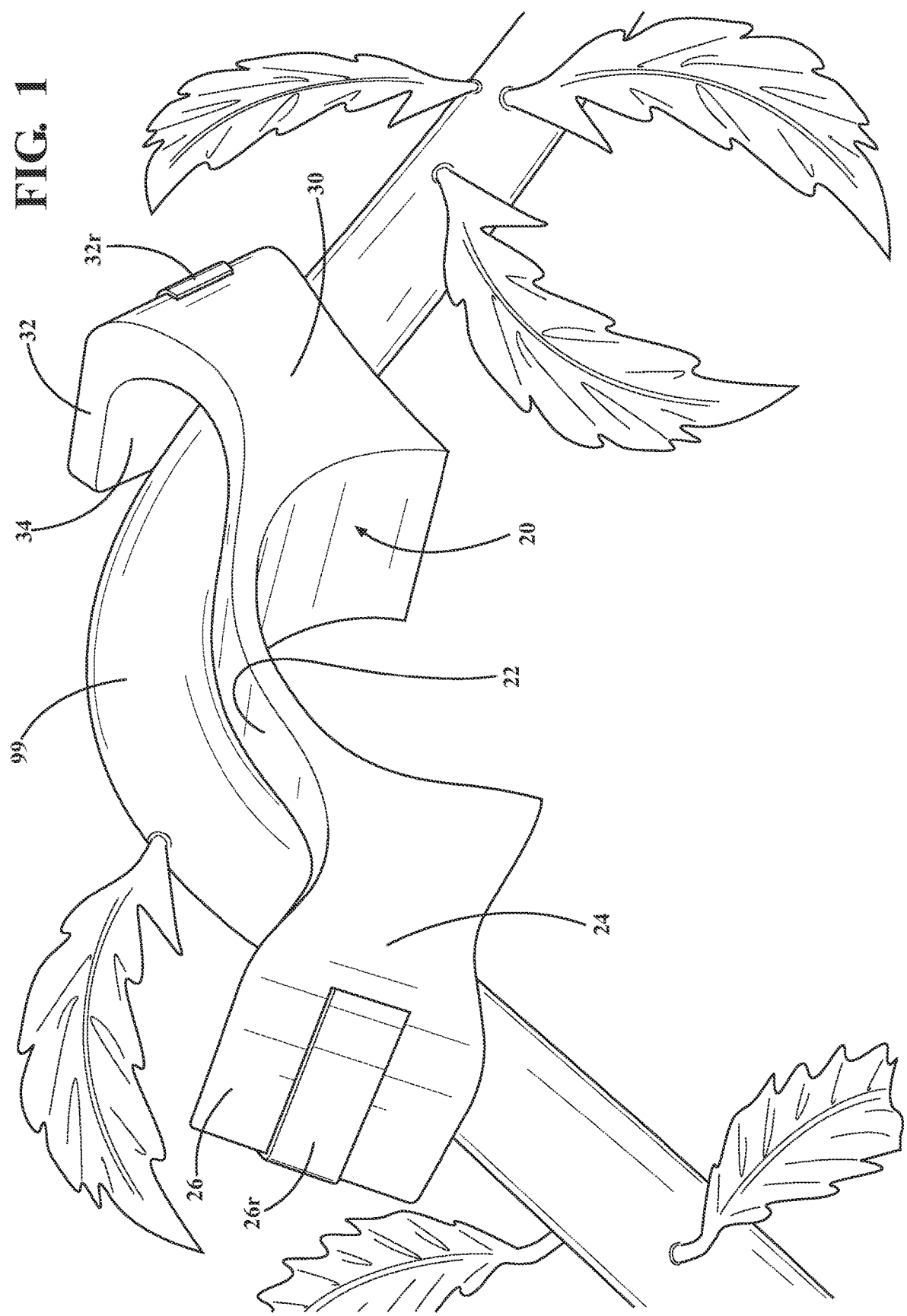
FIG. 1 is a schematic perspective view of a plant training device in accordance with an embodiment described herein, shown mounted on a plant stem.

FIGS. 1-4 show various views of a plant training device 20 in accordance with an embodiment described herein. Referring to FIG. 1, the plant training device 20 is shown mounted to a plant stem 99. In embodiments described herein, the plant training device 20 may include a base portion 22, a first arm 24 extending from the base portion 22, a first wall 26, extending from the first arm 24, a second arm 30 extending from the base portion 22, and a second wall 32 extending from the second arm 30. As seen from FIGS. 1 and 2, the base portion 22, first arm 24, and first wall 26 may combine to define a first channel 28 structured to receive a portion of the plant stem 99 therein. Also, the base portion 22, second arm 30, and second wall 32 may combine to define a second channel 34 structured to receive another portion of the plant stem 99 therein. A portion of the plant stem extending between the first and second channels bends or wraps around the base portion 22. As described herein, the elements of the plant training device maintain the stem 99 in a bent configuration for directed growth.

Figure 2:
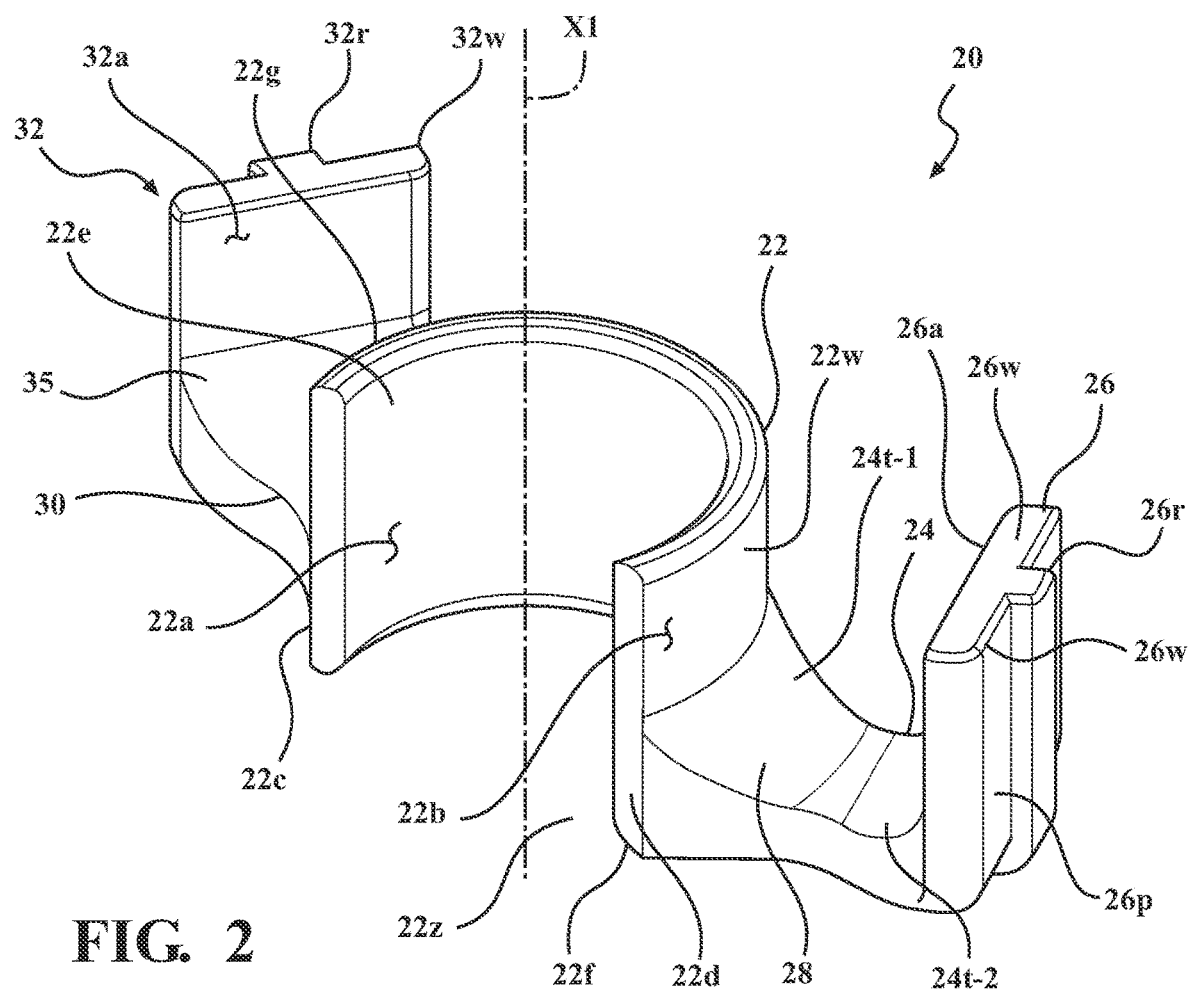
FIG. 2 is another schematic perspective view of the plant training device of FIG. 1, shown detached from the plant stem.
Figure 3:
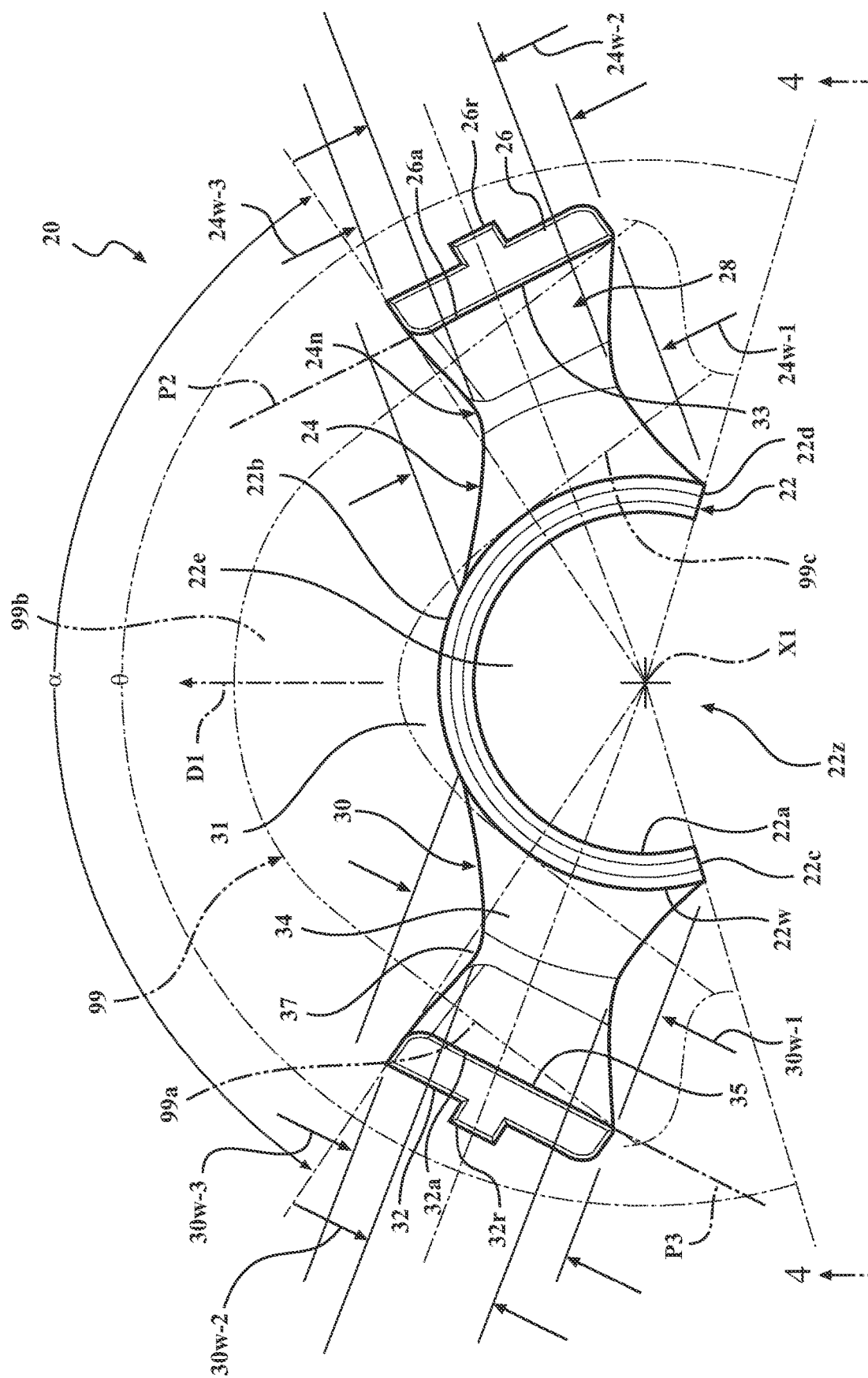
FIG. 3 is a schematic plan view of the plant training device of FIG. 1, shown attached to the plant stem.

Referring to FIGS. 1-4, the base portion 22 may have a semi-cylindrical wall 22w, with a radially interior semi-cylindrical face 22a and a radially exterior semi-cylindrical face 22b opposite the interior face. The base portion 22 may have a first end 22f and a second end 22g opposite the first end. The base portion 22 may have a central axis X1 extending therethrough. As shown in FIGS. 2 and 3, the base portion wall 22w may have a gap or opening 22z formed therein. The base portion 22 may extend through an angle θ (FIG. 3) between ends 22c, 22d of the wall. In particular arrangements, the angle θ may be in the range 160°-220°. The base portion 22 may define a central cavity 22e therein. It has been found that this configuration of the base portion 22 provides a sufficient support structure for arms 24 and 30 while minimally interfering with positioning and growth of adjacent plant stems (i.e., plant stems which are not mounted in the plant training device 20). As described herein, the base portion 22 may be structured to form a bending vertex for a plant stem when the training device 20 is mounted on the plant stem.

Figure 4:
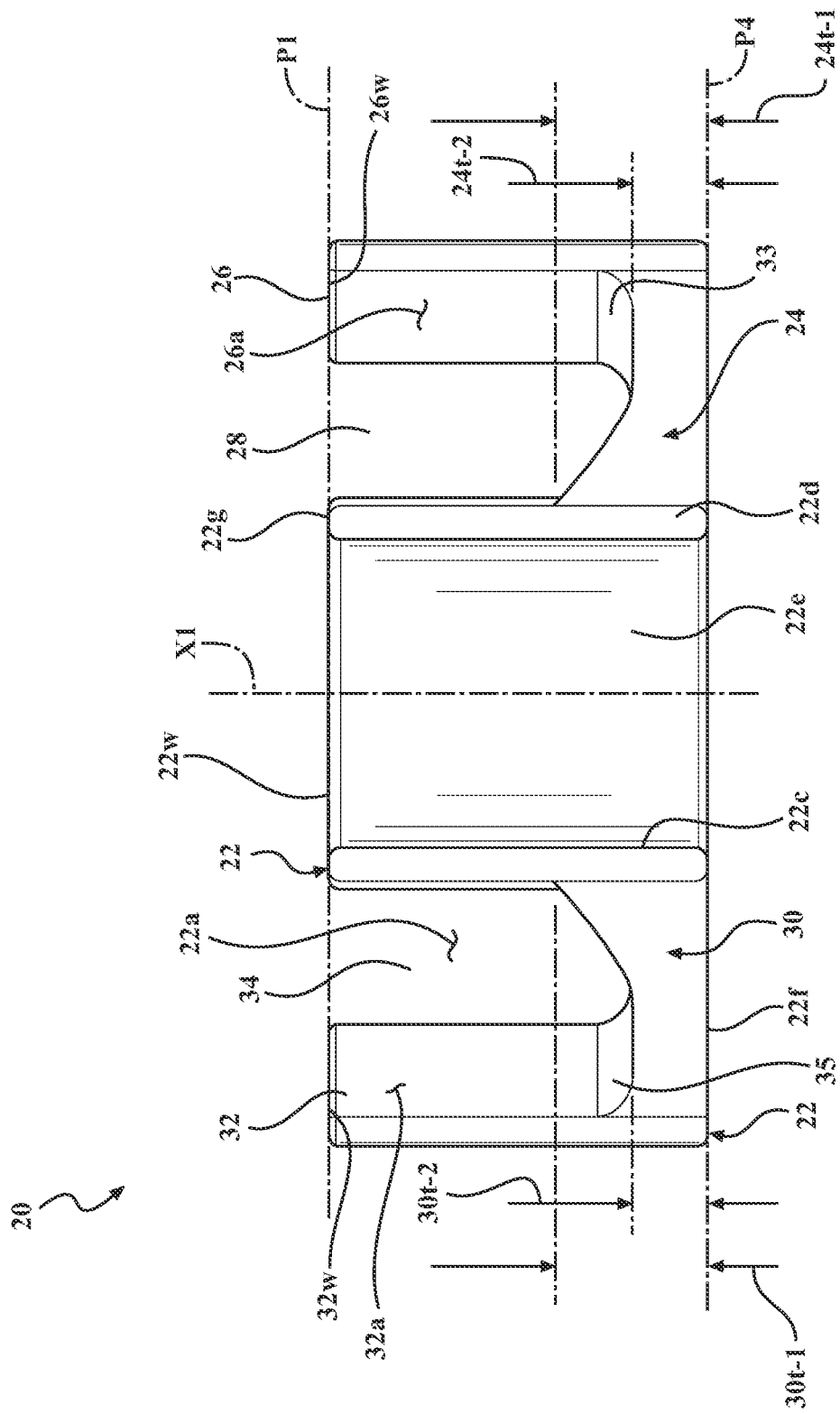
FIG. 4 is a schematic side view of the plant training device of FIG. 1.

Training device 20 may also include a first arm 24 extending radially outwardly from the exterior face 22b. As used herein, an element "extending radially outwardly from the exterior face" means that the element resides along a radius extending from the central axis X1 of the semi-cylindrical base portion 22 and through the exterior face 22b. In particular arrangements, the first arm 24 may extend radially outwardly from the exterior face 22b at the first end 22f of the base portion 22. As seen in FIG. 4, the first arm 24 may extend from the base portion exterior face 22b along a plane P4 perpendicular to the base portion central axis X1.

Referring to FIG. 3, in particular arrangements, the first arm 24 may taper from a first relatively greater width 24w-1 at a junction of the first arm 24 and the base portion exterior face 22b, to a relatively smaller width 24w-2 at a narrower neck region 24n intermediate the base portion 22 and the first wall 26 (described in detail below). The first arm 24 may also taper from a second relatively greater width 24*w*-3 at a junction of the first arm 24 and the first wall 26 to the smaller width 24*w*-2. The configurations of the arms 24, 30 described herein may operate generally as tapered beam structures for efficiently withstanding stresses.

Referring to FIG. 4, the first arm 24 may also taper in a radially outwardly direction from a relatively greater thickness 24*t*-1 at a junction of the first arm 24 and the base portion exterior face 22*b* to a relatively lesser thickness 24*t*-2 at a junction of the first arm 24 and the first wall 26. This taper may tend to bias a stem residing in the first channel 28 (described below) toward a corner 33 formed by the intersection of the first arm 24 with the first wall 26, and also to bias the stem against the first wall 26. This may aid retaining the stem within the first channel 28 during mounting of the training device on the stem and subsequent movement of the plant or the stem.

First wall 26 may extend from the first arm 24 so as to be radially spaced apart from the base portion exterior face 22*b* and directly opposite the base portion exterior face. As used herein, the term "radially spaced-apart" means that the element (in this case, first wall 26) is spaced apart from the exterior face 22*b* so as to reside along a radius extending from the central axis X1 of the base portion 22 through the exterior face 22*b*. In one or more arrangements, the first wall 26 may extend directly opposite the base portion exterior face 22*b* such that the first channel 28 is formed between the base portion exterior face 22*b*, the first arm 24, and the first wall 26.

In one or more arrangements, a face 26*a* of the first wall 26 facing toward the base portion exterior face 22*b* lies along a single flat plane P2 extending from the first arm 24 to an end of the first wall 26. This flat, smooth surface of the portion of the face 26*a* facing the base portion 22 may facilitate unobstructed insertion of the plant stem into the first channel 28 formed between the base portion exterior face 22*b* and the first wall 26.

One or more ribs 26*r* may be formed along a surface 26*p* of the first wall opposite the face 26*a*. Rib(s) 26*r* may strengthen the first wall 26 against forces exerted on the first wall by a plant stem portion residing in the first channel 28 during plant growth. In one or more arrangements, the first wall 26 may extend from the first arm 24 and terminate at an end 26*w* of the first wall 26 structured to be coplanar with the base portion second end 22*g* along a plane P1 extending along the base portion second end.

Training device 20 may also include a second arm 30 separate from the first arm 24. The second arm 30 may extend radially outwardly from the base portion exterior face 22*b*. In particular arrangements, the second arm 30 may extend radially outwardly from the exterior face 22*b* at the first end 22*f* of the base portion 22. The second arm 30 may extend from the base portion exterior face 22*b* along the plane P4 perpendicular to the base portion central axis X1, and in a direction different from the direction in which the first arm 24 extends from the base portion exterior face 22*b*. As shown in FIG. 3, the first and second arms 24, 30 and the first and second walls 26, 32 may be structured so that the second wall 32 may be angularly spaced apart an amount α° from the first wall 26. In particular arrangements, the angle α may be in the range 80°-120°. This angular spacing may form a gap or void 31 between the first and second arms 24, 30. The void 31 between the angularly spaced-apart arms 24, 30 may facilitate user access to the plant stem to aid in positioning of the stem during mounting of the training device to the stem.

In particular arrangements, as seen in FIG. 3, the second arm 30 may taper from a first relatively greater width 30*w*-1 at a junction of the second arm 30 and the base portion exterior face 22*b*, to a relatively lesser width 30*w*-2 at a relatively narrower neck region 37 of the second arm intermediate the base portion 22 and the second wall 32 (described in detail below). The second arm 30 may also taper from a second relatively greater width 30*w*-3 at a junction of the second arm 30 and the second wall 32 to the respective neck region 37.

Referring to FIG. 4, the second arm 30 may also taper in a radially outwardly direction from a relatively greater thickness 30*t*-1 at a junction of the second arm 30 and the base portion exterior face 22*b* to a relatively lesser thickness 30*t*-2 at the junction of the second arm 30 and the second wall 32. This taper may tend to bias a plant stem residing in the second channel 34 (described below) toward a corner 35 formed by the intersection of the second arm 30 with the second wall 32, and also to bias the stem against the second wall 32. This may aid in retaining the stem within the second channel 34 during mounting of the training device 20 on the stem and subsequent movement of the plant or the stem.

Second wall 32 may extend from the second arm 30 so as to be radially spaced apart from the base portion exterior face 22*b* and directly opposite the base portion exterior face. Second wall 32 may be angularly spaced apart from the first wall 26. In one or more arrangements, the second wall 32 may extend directly opposite the base portion exterior face 22*b* such that the second channel 34 is formed between the base portion exterior face 22*b*, the second arm 30, and the second wall 32. As seen in FIG. 3, the second channel 34 may be angularly spaced apart from the first channel 28.

In one or more arrangements, a face 32*a* of the second wall 32 facing toward the base portion exterior face 22*b* lies along a single flat plane P3 extending from the second arm 30 to an end 32*w* of the second wall 32. This flat, smooth surface of the portion of the face 32*a* facing toward the base portion exterior face 22*b* may facilitate unobstructed insertion of the plant stem into the second channel 34 formed between the base portion exterior face 22*b* and the second wall 32.

One or more ribs 32*r* may be formed along a surface 32*p* of the second wall 32 opposite the face 32*a*. Rib(s) 32*r* may strengthen the second wall 32 against forces exerted on the second wall 32 by a plant stem portion residing in the second channel 34 during plant growth. In one or more arrangements, the second wall 32 may extend from the second arm 30 and terminate at the end 32*w* of the second wall 32, which may be structured to be coplanar with the base portion second end 22*g* along the plane P1 extending along the base portion second end 22*g*.

Referring to FIG. 3, a portion of the base portion 22 extending between the first and second channels 28, 34 may be structured to form a bending vertex for a plant stem 99 extending between the first and second channels. A "bend vertex" may be a portion of the training device about which the stem wraps in order to bend the stem. To mount the plant training device to the plant stem 99, a portion 99*a* of the plant stem may be inserted into one of the first and second channels 28, 34. Then, an adjacent portion 99*b* of the stem 99 may be bent around the base portion 22 so that yet another portion 99*c* of the stem may be inserted into the other one of the first and second channels 28, 34. The position of the device 20 on the plant stem 99 may then be adjusted if needed (for example, by moving the base portion 22 slightly in direction D1 with portions of the stem residing in channels 28, 34) to bring the bent portion of the stem as close as possible to the base portion 22. In this respect, the base portion 22 functions as a bend vertex for the bent portion of the plant stem 99. FIG. 3 shows an outline (in phantom) of a plant stem 99 with portions 99a, 99c of the stem extending into the first and second channels 28, 34 and with stem portion 99b wrapped around the base portion 22.

In the above detailed description, reference is made to the accompanying figures, which form a part hereof. In the figures, similar symbols typically identify similar components, unless context dictates otherwise. The illustrative embodiments described in the detailed description, and figures are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

What is claimed is:

1. A plant training device comprising:
   a base portion including a semi-cylindrical radially interior face and a semi-cylindrical radially exterior face opposite the interior face;
   a first arm directly connected to and extending radially outwardly from the exterior face;
   a second arm directly connected to and extending radially outwardly from the exterior face so as to be angularly spaced apart from the first arm;
   a first wall extending from the first arm so as to be radially spaced apart from the exterior face and directly opposite the exterior face; and
   a second wall extending from the second arm so as to be radially spaced apart from the exterior face and directly opposite the exterior face.

2. The plant training device of claim 1 wherein each of the first and second arms extends radially outwardly from the exterior face at a first end of the base portion, and wherein each of the first wall and the second wall has a face lying along a respective single flat plane extending from a respective one of the first arm and the second arm to an end of the respective wall.

3. The plant training device of claim 1 wherein each of the first and second arms tapers from a respective first relatively greater width at a junction of the respective arm and the base portion to a relatively narrower respective neck region intermediate the base portion and an associated one of the first and second walls.

4. The plant training device of claim 3 wherein each of the first and second arms tapers from a respective second relatively greater width at a junction of the respective arm and an associated one of the first and second walls, to the relatively narrower respective neck region intermediate the base portion and the associated one of the first and second walls.

5. The plant training device of claim 1 wherein the first arm extends from the base portion exterior face in a first direction and along a plane perpendicular to a central axis of the base portion, and wherein the second arm extends from the exterior face along the plane perpendicular to the base portion central axis and in a second direction different from the first direction.

6. The plant training device of claim 1 wherein the second wall is angularly spaced apart from the first wall by an angle in a range of 80°-120°.

7. The plant training device of claim 1 wherein the first wall extends directly opposite the exterior face such that a first channel is formed between the exterior face, the first arm, and the first wall, and wherein the second wall extends directly opposite the exterior face such that a second channel is formed between the exterior face, the second arm, and the second wall, the second channel being angularly spaced apart from the first channel.

8. The plant training device of claim 7 wherein a portion of the base portion extending between the first and second channels is structured to form a bend vertex for a plant stem extending between the first and second channels.

9. The plant training device of claim 1 wherein the first wall extends from the first arm and terminates at an end of the first wall structured to be coplanar with an end of the base portion.

10. The plant training device of claim 9 wherein the second wall extends from the second arm and terminates at an end of the second wall structured to be coplanar with the end of the base portion.

11. The plant training device of claim 1 wherein a face of the first wall facing the exterior face lies along a single flat plane extending from the first arm to an end of the first wall, and wherein a face of the second wall facing the exterior face lies along a single flat plane extending from the second arm to an end of the second wall.

12. The plant training device of claim 1 wherein the base portion extends along an angle in a range of 160°-200°.

13. The plant training device of claim 1 wherein the first wall extends from the first arm in a direction parallel to a central axis of the base portion, and wherein the second wall extends from the second arm in a direction parallel to the central axis of the base portion.

14. A plant training device comprising:
   a base portion including a semi-cylindrical radially interior face and a semi-cylindrical radially exterior face opposite the interior face;
   a first arm extending radially outwardly from the exterior face;
   a second arm extending radially outwardly from the exterior face so as to be angularly spaced apart from the first arm;
   a first wall extending from the first arm so as to be radially spaced apart from the exterior face and directly opposite the exterior face; and
   a second wall extending from the second arm so as to be radially spaced apart from the exterior face and directly opposite the exterior face,
wherein the each of the first and second arms tapers in a radially outwardly direction from a respective relatively greater thickness at a junction of the respective arm and the exterior face, to a respective relatively lesser thickness at a junction of the respective arm and an associated one of the first and second walls.

15. A plant training device comprising:

a base portion including a semi-cylindrical radially interior face and a semi-cylindrical radially exterior face opposite the interior face;

a first arm extending radially outwardly from the exterior face;

a second arm extending radially outwardly from the exterior face so as to be angularly spaced apart from the first arm;

a first wall extending from the first arm so as to be radially spaced apart from the exterior face and directly opposite the exterior face;

a second wall extending from the second arm so as to be radially spaced apart from the exterior face and directly opposite the exterior face; and a void region formed directly opposite the exterior face between the first and second walls, the void region being structured to accommodate movement of a portion of a plant stem therein without the portion of the plant stem contacting the plant training device.

* * * * *